United States Patent
Jiddi et al.

(10) Patent No.: US 10,930,059 B2
(45) Date of Patent: Feb. 23, 2021

(54) METHOD AND APPARATUS FOR PROCESSING VIRTUAL OBJECT LIGHTING INSERTED INTO A 3D REAL SCENE

(71) Applicant: INTERDIGITAL CE PATENT HOLDINGS, SAS, Paris (FR)

(72) Inventors: Salma Jiddi, Cesson-Sevigne (FR); Gregoire Nieto, Rennes (FR); Philippe Robert, Rennes (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 16/390,098

(22) Filed: Apr. 22, 2019

(65) Prior Publication Data
US 2019/0325640 A1    Oct. 24, 2019

(30) Foreign Application Priority Data
Apr. 24, 2018    (EP) .................................... 18305506

(51) Int. Cl.
*G06T 15/50*    (2011.01)
*G06T 15/04*    (2011.01)

(52) U.S. Cl.
CPC ............ *G06T 15/506* (2013.01); *G06T 15/04* (2013.01); *G06T 2200/04* (2013.01); *G06T 2200/08* (2013.01)

(58) Field of Classification Search
CPC ... G06T 15/506; G06T 15/04; G06T 2200/04; G06T 2200/08
USPC ...................................................... 345/426
See application file for complete search history.

(56) References Cited

U.S. PATENT DOCUMENTS

| 5,878,152 A | * | 3/1999 | Sussman | ............ G01B 11/2513 382/106 |
| 6,753,876 B2 | * | 6/2004 | Brooksby | ............... G01B 11/25 345/440 |
| 2009/0322745 A1 | | 12/2009 | Zhang et al. | |

FOREIGN PATENT DOCUMENTS

EP    3352138    7/2018

OTHER PUBLICATIONS

Jiddi et al., "Illumination Estimation using Cast Shadows for Realistic Augmented Reality Applications", 2017 IEEE International Symposium on Mixed and Augmented Reality (ISMAR-ADJUNT), Nantes, France, Oct. 9, 2017, pp. 192-193.
Angelopoulou et al., "Photometric Surface Analysis in a Tri-Luminal Environment", Seventh IEEE International Conference on Computer Vision, Kerkyra, Greece, Sep. 20, 1999, pp. 442-449.
Jiddi et al., "Photometric Registration using Specular Reflections and Application to Augmented Reality", 2nd Asia Pacific Workshop on Mixed and Augmented Reality, Taipei, Taiwan, Apr. 13, 2018, pp. 1-4.
Sato et al., "Illumination from Shadows", IEEE Transactions on Pattern Analysis and Machine Intelligence, vol. 25, No. 3, Mar. 2003, pp. 290-300.

(Continued)

*Primary Examiner* — King Y Poon
*Assistant Examiner* — Vincent Peren
(74) *Attorney, Agent, or Firm* — Invention Mine LLC

(57) ABSTRACT

A method and an apparatus for processing a 3D scene are disclosed. A reference image representative of an image of the scene captured under ambient lighting is determined. A texture-free map is determined from said reference image and an input image of the scene. The 3D scene is then processed using the determined texture-free map.

15 Claims, 4 Drawing Sheets

(56) References Cited

OTHER PUBLICATIONS

Figure 1:
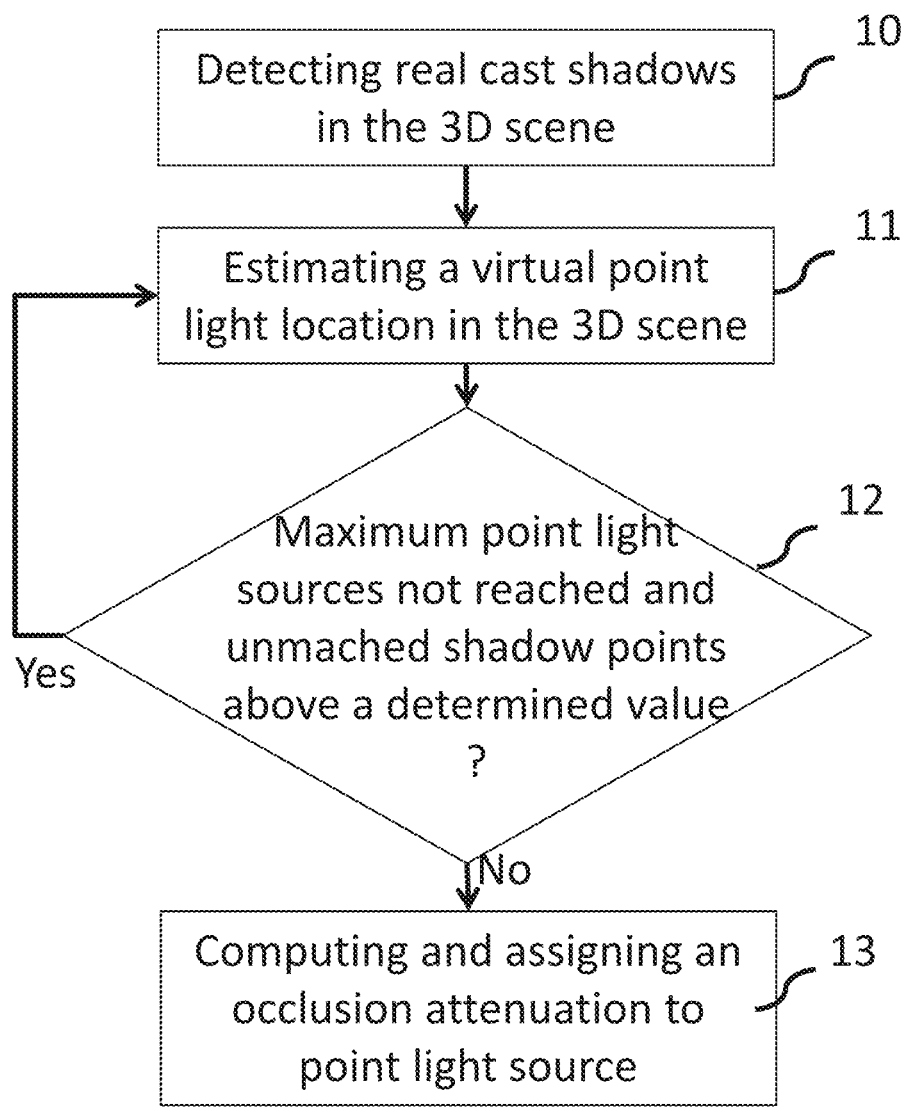

Laffont et al., "Intrinsic Decomposition of Image Sequences from Local Temporal Variations", 2015 IEEE International Conference on Computer Vision (ICCV 2015), Santiago, Chile, Dec. 7, 2015, pp. 433-441.
Meka et al., "Live User-Guided intrinsic Video for Static Scenes", IEEE Transactions on Visualization and Computer Graphics, vol. 23, No. 11, Nov. 2017, pp. 2447-2454.
Panagopoulos et al., "Robust Shadow and Illumination Estimation Using a Mixture Model", 2009 IEEE Conference on Computer Vision and Pattern Recognition, Miami, Florida, USA, Jun. 20, 2009, pp. 651-658.
Phong, "Illumination for Computer Generated Pictures", Communications of ACM—Graphics and Image Processing, vol. 18, No. 6, Jun. 1975, pp. 311-317.
Arief et al., "Realtime Estimation of Illumination Direction for Augmented Reality on Mobile Devices", 20th Color and Imaging Conference (CIC 2012), Los Angeles, California, USA, Nov. 12, 2012, pp. 111-116.
Calian, D. et al., "The shading probe: Fast appearance acquisition for mobile AR." In SIGGRAPH Asia 2013 Technical Briefs, pp. 1-4. 2013.

\* cited by examiner

METHOD AND APPARATUS FOR PROCESSING VIRTUAL OBJECT LIGHTING INSERTED INTO A 3D REAL SCENE

1. REFERENCE TO RELATED EUROPEAN APPLICATION

This application claims priority from European Patent Application No. 18305506.0, entitled "Method and Apparatus for Processing A 3D Scene", filed on Apr. 24, 2018, the contents of which are hereby incorporated by reference in its entirety.

2. TECHNICAL FIELD

The present disclosure relates to 3D scene lighting for mixed reality. More particularly, the present disclosure relates to virtual object lighting inserted into a 3D real scene.

3. BACKGROUND ART

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Determining lighting effects on surfaces of a 3D scene in presence of textures has a wide interest. For instance, it is possible to characterize the 3D light sources (e.g. 3D positions, color . . . ) of the 3D scene from the lighting effects, or to determine the specular reflectance of the observed surfaces. When determining lighting effects is combined with 3D lighting estimation, other applications are possible, in particular in mixed reality: for example, to relight a 3D scene or to insert virtual objects in the 3D scene while both lighting them and rendering virtual cast shadows correctly.

For example, mixed reality scenes can be rendered using a tablet or a glass-type HMD (Head Mounted Device). In this example, the camera mounted on the device (tablet or HMD) is used to capture a video of the scene. A mixed reality application transforms the captured video and displays it on the screen of the device. In parallel, the camera and a computing module of the device are used to analyze the 3D lighting in the captured scene and to estimate the camera 3D pose.

For 3D lighting estimation, it is commonly assumed that the scene is textureless or presents weakly textured surfaces. For example, in 3D lighting estimation methods relying on cast shadows: in presence of strong textures, it becomes difficult to separate the textures from the cast shadows.

Therefore, there is a need for a new method for processing a 3D scene.

4. SUMMARY

According to an aspect of the present disclosure, a method for processing a 3D scene is disclosed. Such a method comprises:
  obtaining a reference image of the scene captured by a camera under ambient lighting. The reference image comprises a reference area representative of a reference diffuse surface captured under the ambient lighting;
  obtaining an input image of the scene captured by a camera;
  determining a texture image from said reference image according to an ambient light intensity. The ambient light intensity is determined according to at least one part of the reference area;
  determining a texture-free image. The value of a pixel of the texture-free image is a ratio of an intensity at the corresponding pixel in said input image over a value of an intensity at the same pixel in the texture image; and
  processing the 3D scene by using this texture-free image.

5. BRIEF DESCRIPTION OF THE DRAWINGS

Figure 2A:
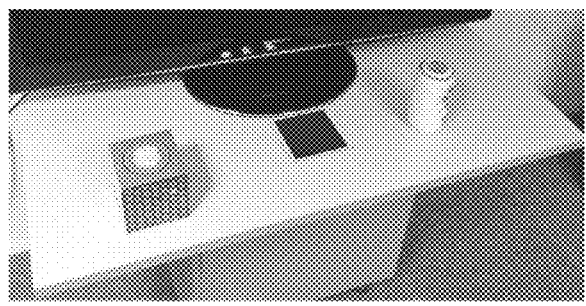
Figure 2B:
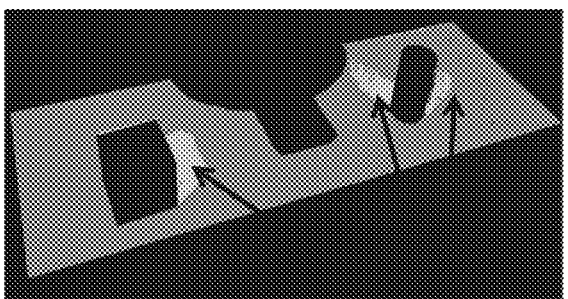
Figure 2C:
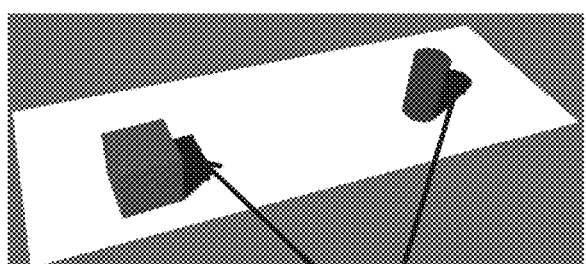
Figure 2D:
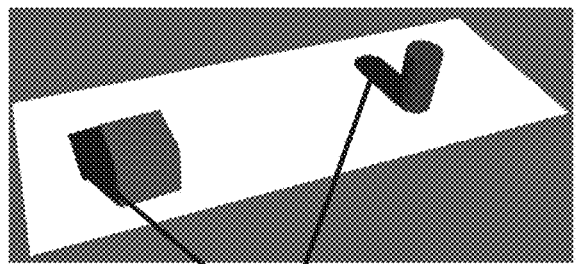
Figure 3:
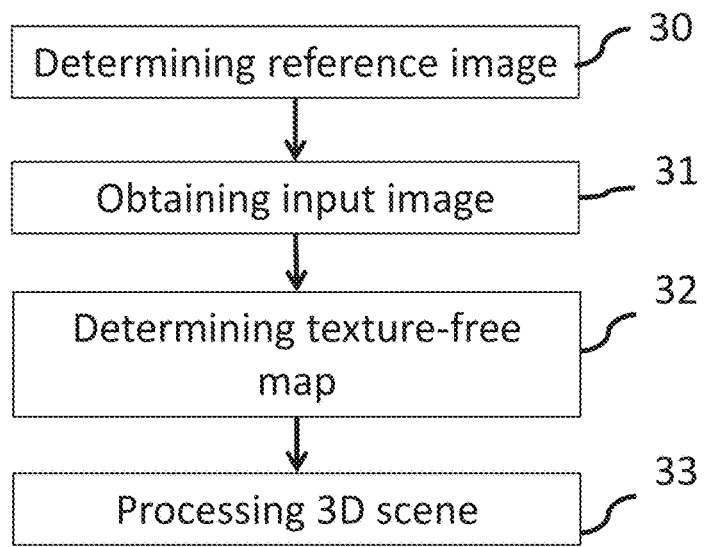
Figure 4:
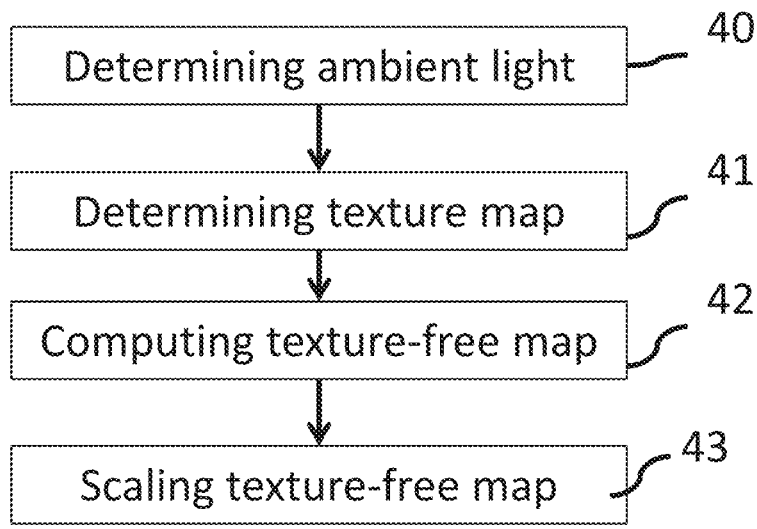
Figure 5:
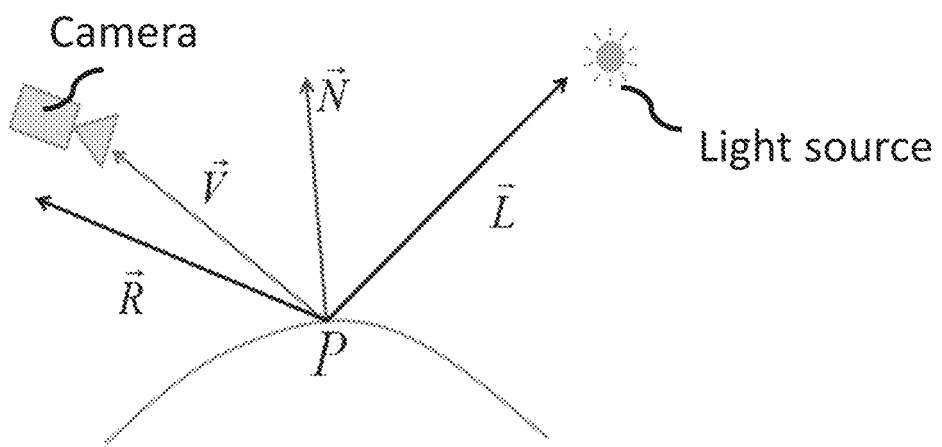
Figure 6:
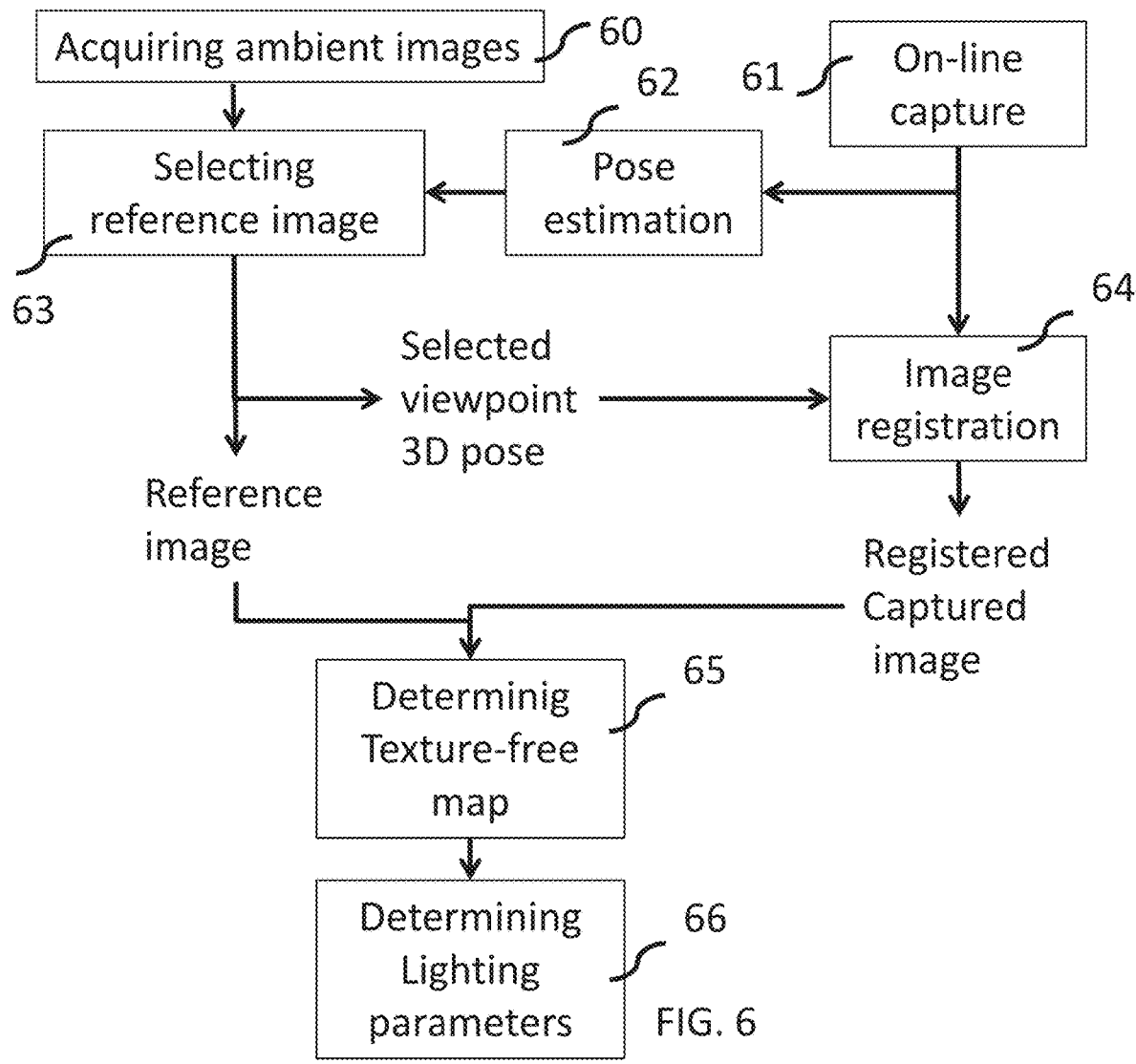
Figure 7:
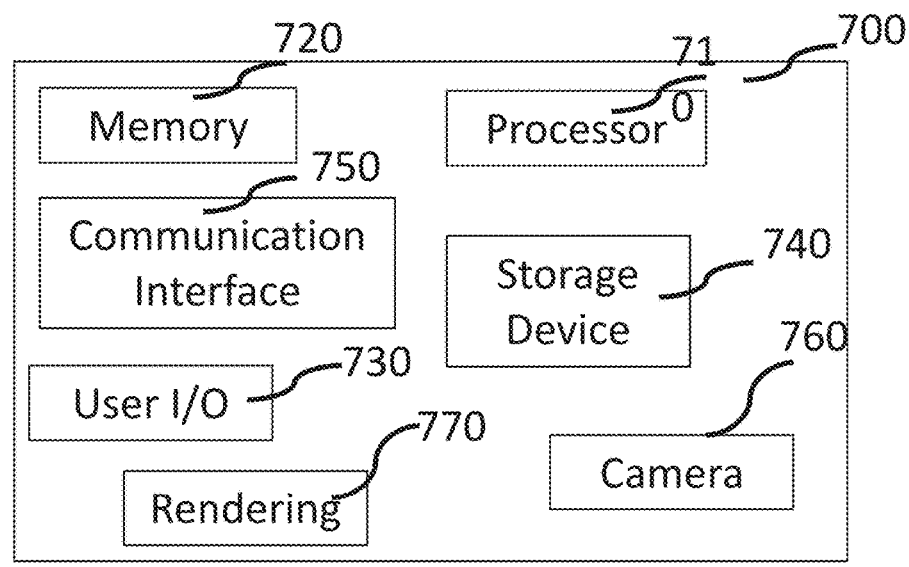

FIG. 1 illustrates an exemplary method for determining 3D position of candidates point light sources of the 3D scene according to an embodiment of the present disclosure,
FIG. 2A illustrates an image of a 3D scene,
FIG. 2B illustrates cast shadows of objects in the 3D scene from the image illustrated by FIG. 2A,
FIG. 2C illustrates an image of the 3D scene rendered with a point light source,
FIG. 2D illustrates another image of the 3D scene rendered with another point light source,
FIG. 3 illustrates an exemplary method for processing a 3D scene according to an embodiment of the present disclosure,
FIG. 4 illustrates an exemplary method for determining a texture-free map according to an embodiment of the present disclosure,
FIG. 5 illustrates an exemplary illustration of specular reflection at a point P of a surface,
FIG. 6 illustrates an exemplary method for processing a 3D scene according to another embodiment of the present disclosure, and
FIG. 7 illustrates an exemplary apparatus for processing a 3D scene according to an embodiment of the present disclosure.

6. DESCRIPTION OF EMBODIMENTS

Shadows are important visual cues as they retain valuable information about the location and intensity of the light sources present in a real scene. Lighting parameters of scene may be determined by analyzing shadows cast on surfaces of the scene. A classical scene is composed of object(s) placed on a planar surface, as illustrated in FIG. 2A.

In order to correctly light a virtual scene, rendering correctly lit virtual objects and faithfully rendering shadows cast by the virtual objects onto the real scene is essential. Two main features contribute to the realism of the shading and of the cast shadows: the 3D location/orientation of the shadows and their strength given by the attenuation of the color intensity of the shaded surface.

In presence of hard shadows, a set of virtual lighting models exists: point lights, spot lights or directional lighting.

In the embodiments disclosed herein, lighting is modeled by a set of 3D point light sources. The 3D location of such source light points and the shadow attenuation associated to each source light point can be estimated from a unique video camera observing the real scene.

It should be noted that lighting conditions in a real scene are not stable and change continuously. Therefore, for improving the realism of mixed reality, lighting environment has to be estimated continuously.

In order to estimate the 3D location of the light sources in the real scene, the real scene is analyzed via image processing.

FIG. 1 illustrates an exemplary method for light sources location determination.

It is assumed that a 3D geometric model of the real scene is available as well as an image of the scene captured from an input video camera with known 3D pose in the 3D model coordinate system. The 3D pose of the input video camera not only comprises the 3D location of the input video camera in the 3D model coordinate system, but also intrisic camera parameters.

For instance, location in the 3D scene of point light sources is determined for point light sources from a set of candidate point light sources. Such a set of 3D point light sources can be a list of 3D poses or a structured tree of 3D locations.

In step 10, real cast shadows are detected in an input RGB (Red Green Blue) image of the scene obtained for the input video camera. Real cast shadows correspond to shadows of the real objects present in the scene cast by the real light sources and captured by the input video camera.

FIG. 2A illustrates an example of an input RGB image. FIG. 2B illustrates corresponding cast shadows detected in the input image. On FIG. 2B, detected cast shadows appear in light grey and are identified by the arrows pointing from the reference 20.

In step 11, for a candidate light source, the virtual shadow obtained by the candidate light source is matched with the detected cast shadows.

In order to do so, in step 11, a rendered image is obtained for the candidate point light source. Such a rendered image may be obtained by any known method for 3D rendering cast shadows from the candidate point light source. The rendered image comprises shadows cast by the associated candidate point light source from the set of point light sources.

FIGS. 2C and 2D illustrates examples of images rendered with different point light sources, and using the viewpoint in the 3D scene as the viewpoint of the input video camera, similar as the viewpoint used for obtaining the input RGB image.

It can be seen on FIGS. 2C and 2D that cast shadows, respectively 21 and 22, depend on the location of the 3D point light source used to render the image. On FIG. 2C, the 3D point light source is located on the left of the projected scene, while on FIG. 2D, the 3D point light source is located on the right of the projected scene.

Then, in step 11, the rendered image is matched with the mask of real cast shadows detected at step 10. Matching the rendered image with the detected real cast shadow may be carried out via the computation of correlation between the binary mask of the detected real cast shadows and the binary mask of the virtual shadows cast by the candidate 3D point light source. The candidate 3D point light source providing the largest correlation value is selected as the 3D point light source.

The 3D position of the point light source corresponds to the 3D location of the selected candidate point light source.

In step 11, once the location of a candidate point light source is determined, matched pixels that match both the mask of detected real cast shadows and the virtual cast shadows obtained from the candidate point light source are marked so as to discard those pixels when estimating other point light sources location.

When estimating other point light sources, in step 11, the pixels that have been marked in determining previous point lights are discarded.

In step 12, it is verified if a maximum number of point light sources have not yet been determined, and if the number of unmatched real shadow points is above a determined value.

For instance, a maximum of point light sources may correspond to a maximum number of point light sources that can be satisfactorily processed by the rendering engine.

If both conditions cited above are true, one more point light source is selected from the set of candidate 3D point light sources and added to the 3D scene. The matching operation is repeated for the new 3D point light source (step 11). It should be noted that when repeating the matching operation for a new 3D point light source, the detected real shadow points that match virtual shadow points cast from a 3D point light source previously determined are discarded.

When at least one condition among the two conditions cited above is false, 3D point light sources location determination ends, and in step 13, an occlusion attenuation is computed and assigned to each 3D point light source determined in step 11.

The detection of cast shadows on surfaces of the scene may be problematic in presence of textures: the method discussed above assumes that these surfaces are textureless (or weakly textured) and is based on modeling their intensity in absence of shadows. Either the areas where shadows can be cast are excluded from modeling as in the method disclosed above or the objects that cause the cast shadows are removed to get an image without shadows as is done in Sato et al. "*Illumination from Shadows*", PAMI'02.

In this document, Sato et al. consider the shadows cast onto a planar surface by an object from several light sources. Two images are captured, one with the object placed on the planar surface, the other without this object. The difference between the two images allows to highlight the shadows cast onto the planar surface. Of course, this method is possible only if the object can be moved which is not the case for many scenes.

In Arief et al. "*Realtime Estimation of Illumination Direction for Augmented Reality on Mobile Devices*", CIC 2012, Arief et al. consider a shadow cast on a textureless planar surface. There is only one light source that creates a single shadow that is easy to detect.

In A. Panagopoulos et al. "*Robust Shadow and Illumination Estimation Using a Mixture Model*", CVPR'09, Panagopoulos et al. propose a method for shadow detection and illumination estimation in presence of textured surfaces. The method relies on a single RGB image and a coarse 3D geometry of the scene. However, the method proposed in this document is complex, time-consuming, and requires powerful processing.

According to the principle disclosed herein, the method for processing a 3D scene allows to remove the texture from the surface so that only the lighting effects modulate the surface intensity in the processed image.

A field of image processing addresses the decomposition of the images in intrinsic images, mainly diffuse reflectance (albedo) image and shading image. Most of them do not consider the estimation of cast shadows and specular reflections (e.g. in A. Meka et al. "*Live User-Guided Intrinsic Video for Static Scenes*", IEEE Transactions on Visualization and computer graphics, 2017). In P -Y. Laffont et al. "*Intrinsic Decomposition of Image Sequences from Local Temporal Variation*", ICCV 2015, the disclosed method relies on a stationary camera and varying illumination to separate albedo and shading, the latter including cast shadows and specular reflections. According to this method, multiple image acquisitions with different illuminations are needed to estimate the "shading" image. While, according to the principle disclosed herein, only one reference image is sufficient in case of a static camera.

FIG. 3 illustrates an exemplary method for processing a 3D scene according to an embodiment of the present disclosure. The exemplary method is based on the acquisition of at least one reference image of the scene under ambient lighting. In case of static camera, only one reference image is needed, also called ambient image here below. In case of a moving camera, several ambient images can be acquired and a reference image is selected among the several ambient images as will be discussed below in relation with FIG. 6.

At step 30, a reference image or ambient image is thus obtained. The reference image is captured under quasi-ambient lighting. Practically, direct lighting on the scene must be avoided for this capture and indirect lighting origin should be as isotropic as possible. The model of the "ambient" image $I_A(p)$ that is captured is as follows, based on the Phong photometric equation discussed below:

$I_A(p) = k_d(p) \cdot L_b$, where $L_b$ is the ambient light, and $k_d(p)$ is the diffuse component of the surface at point p. It can be seen that an "ambient" image captured under ambient lighting is representative of lighting conditions wherein the light comes from everywhere, i.e. there is no point light source lighting the scene.

At step 31, the video of the scene for an on-line Augmented Reality application for instance is captured under any lighting conditions. An input RGB image $I_C(p)$ is thus obtained from the video, as the image currently being captured. The input RGB image is captured by the camera under "normal" lighting, e.g. the lighting used in the on-line Augmented Reality application.

At step 32, at each capture of an input image, the input image is compared with the reference image to determine a "texture-free" map. The "texture-free" map corresponds to the input image of the scene or a registered version of the input image $I_C(p)$ in case the reference image and the input image do not have the same viewpoint, wherein the texture has been removed.

At step 33, the "texture-free" map can then be used for processing the 3D scene.

According to an embodiment of the present disclosure, the "texture-free" map can be used for determining light sources in the scene as discussed in relation with FIG. 1. In this embodiment, in the method for determining lighting parameters, the "texture-free" map is thus used as the input image used to detect cast shadows.

According to another embodiment of the present disclosure, the method disclosed above can be used for decomposing the 3D scene in intrinsic images, commonly named "reflectance" image representative of the textured image, and "shading" image. The "texture-free" map determined at step 32 corresponds to the reflectance image of the input RGB image. For instance, retexturing of the input RGB images can then be performed, wherein the reflectance image is modified before recombining it with the shading image.

At step 32, to determine the "texture-free" map, the Phong photometric equation (B. Phong "Illumination for computer generated pictures, Communication of the ACM, 18(6): 311-317, June 1975) is considered:

$$I(p) = k_d(p) \cdot L_a + k_d(p) \cdot \Sigma_i O_i(p) \cdot \delta_i(p) \cdot (\vec{N}_p \cdot \vec{L}_i(p)) \cdot L_i + \Sigma_h k_s(p) \cdot O_h(p) (\vec{R}_h(p) \cdot \vec{V}_p)^\alpha L_h \quad \text{(Eq. 1)}$$

where I(p) is the intensity of pixel p, that corresponds to point P in the 3D scene, $k_d(p)$, $k_s(p)$ are respectively the diffuse and specular reflectance components of the surface at point P, α is the shininess of the surface at point P, $L_a$, $L_i$, $L_h$ are intensities of the ambient light and of point lights with indices i and h. $O_i(p)$, $O_h(p)$ are occlusion flags, equal to 1 if light of index i (or h) is visible from point P, equal to 0 otherwise. $\delta_i(p)$ is an attenuation factor that depends on the distance of point light of index i with respect to point P, $\vec{N}_p$ is the normal vector of the surface at pixel p, $\vec{L}_i(p)$ is the 3D direction of point light with index i with respect to the 3D point P corresponding to pixel p, $\vec{V}_p$ is the 3D direction pointing from 3D point P towards the camera focal center, $\vec{R}_h(p)$ is linked to $\vec{L}_h(p)$, the 3D direction of point light with index h from 3D point P: this is the 3D direction of the ray of light corresponding to the perfect reflection of incident ray of light with index h at point P. All these vectors are normalized to 1. FIG. 5 shows an exemplary illustration of these vectors at a point P of a surface.

FIG. 4 illustrates an exemplary method for determining a texture-free map according to an embodiment of the present disclosure. The reference image, or ambient image determined at step 30 and the RGB input image $I_C(p)$ obtained at step 31 are used as inputs to the method.

The photometric model equation of the RGB input image is given by Equation 1 above.

According to the embodiment disclosed herein, a reference diffuse surface should be present in the reference image. According to the variant described here, the reference diffuse surface is white.

At step 40, the ambient light $L_b$ in the reference image ("ambient" image) is determined. The reference diffuse white surface captured under ambient lighting provides an estimate of the ambient light $L_b$. This can be given for example by the mean color value computed over an image patch selected in the white surface: $L_b = \text{mean}_{wp}(I_A(p))/255$. Light intensity is supposed to be comprised between 0 and 1. The image patch can be selected manually by a user on the image or determined automatically using image processing method for detecting a white surface in the "ambient" image.

At step 41, a texture map $I_T(p)$ is determined, as follows:

$$I_T(p) = \frac{I_A(p)}{L_b} = k_d(p).$$

The quality of the texture map highly depends on the quality (isotropy) of the ambient lighting. The texture map $I_T(p)$ provides for each pixel p, the value of the diffuse reflectance component at p.

At step 42, the "texture-free" map $I_{TF}(p)$ is then determined as a ratio of the intensity of the input image over the value of the texture map, as follows:

$$I_{TF}(p) = \frac{I_C(p)}{I_T(p)}.$$

This equation can be rewritten using the Phong equation of $I_C(p)$ as:

$$I_{TF}(p) = \frac{I_C(p)}{I_T(p)} = \frac{k_d(p) \cdot L_a + k_d(p) \cdot \sum_i O_i(p) \cdot \delta_i(p) \cdot (\overrightarrow{N_p} \cdot \overrightarrow{L_t}) \cdot L_i + k_s(p) \cdot \sum_h O_h(p)(\overrightarrow{R_h} \cdot \overrightarrow{V_p})^\alpha L_h}{k_d(p)}$$

which can be rewritten as $$\Rightarrow I_{TF}(p) = L_a + \sum_i O_i(p) \cdot \delta_i(p) \cdot (\overrightarrow{N_p} \cdot \overrightarrow{L_t}) \cdot L_i + \frac{k_s(p)}{k_d(p)} \cdot \sum_h O_h(p)(\overrightarrow{R_h} \cdot \overrightarrow{V_p})^\alpha L_h$$

It can be seen that in the specular-free areas, the "texture-free" map does not depend on the surface reflectance:
$I_{TF}(p) = L_a + \Sigma_i O_i(p) \cdot \delta_i(p) \cdot (\overrightarrow{N_p} \cdot \overrightarrow{L_t}) \cdot L_i$
and in the specular-free areas lit by all lights, that is $O_i(p) = 1$ for all index i:
$I_{TF}(p) = L_a + \Sigma_i \delta_i(p) \cdot (\overrightarrow{N_p} \cdot \overrightarrow{L_t}) \cdot L_i \leq L_a + \Sigma_i L_i$ By convention, the sum of all light intensities (point light sources and ambient light) is assumed to be equal to 1 ($L_a + \Sigma_i L_i = 1$). Therefore, in the specular-free areas lit by all lights, the "texture-free" map is:

$I_{TF}(P) = L_a + \Sigma_i \delta_i(p) \cdot (\overrightarrow{N_p} \cdot \overrightarrow{L_t}) \cdot L_i \leq 1$ On the other hand, in the specular areas, that is in the textured areas, the "texture-free" map depends on both diffuse and specular surface reflectance:

$$I_{TF}(p) = I_D(p) + \frac{k_s(p)}{k_d(p)} \cdot \sum_h O_h(p)(\overrightarrow{R_h} \cdot \overrightarrow{V_p})^\alpha L_h,$$

where $I_D(p) = L_a + \sum_i O_i(p) \cdot \delta_i(p) \cdot (\overrightarrow{N_p} \cdot \overrightarrow{L_t}) \cdot L_i$ The values of the "texture-free" map should be comprised between 0 and 1, however two extreme cases may happen in the computed images:
In the texture map: $I_T(p) = 0$,
In the "texture-free" map:

$$\frac{I_C(p)}{I_T(p)} \gg 1,$$

this case may happen for the pixels for which the value of the texture map is close to 0.
Both cases lead to extreme values in the "texture-free" map $I_{TF}(p)$ that should be discarded.
The structure of the texture is slightly visible in the specular areas: this is explained by the equation of $I_{TF}(p)$ in these areas, where diffuse reflectance $k_d(p)$ is still present.
In this context, in order to use the "texture-free" map for processing the 3D scene, for instance for determining lighting parameters of the scene, the "texture-free" map should be improved.
The "texture-free" map $I_{TF}(p)$ does not have the format of a classical image, that is an image whose values are ≥0 and ≤255 in an 8-bit representation.
For that purpose, according to an embodiment of the present disclosure, at 43, the "texture-free" map is scaled with a scale factor "M", to get approximately values range of an image:

$$I_{TF}(p)^s = M \cdot \left(L_a + \sum_i O_i(p) \cdot \delta_i(p) \cdot (\overrightarrow{N_p} \cdot \overrightarrow{L_t}) \cdot L_i + \frac{k_s(p)}{k_d(p)} \cdot O_h(p)(\overrightarrow{R_h} \cdot \overrightarrow{V_p})^\alpha L_h\right) = M \cdot I_{TF}(p),$$

where $I_{TF}(p)^s$ is the scaled version of the "texture-free" map.
With such a scaling, values at 0 in the "texture-free" map remain at 0, and the values of pixels located in the areas lit by all lights are equal or slightly below M.
On the other hand, in the specular areas, most of the values are larger than M and at step 43, the values greater than 255 are saturated at 255.
The value of the scale factor M can be chosen for example to limit the number of pixels with saturated intensity values to a given number, for example 1% of the image pixels, or it can be chosen from the pixels which value is saturated (at 255 in an 8-bit representation) in $I_C(p)$, for example M can be chosen so that the pixel saturated in $I_C(p)$ with the minimal value in $I_{TF}(p)$ is again saturated in $I_{TF}(p)^s$ (so that at least all pixels saturated in $I_C(p)$ are also saturated in $I_{TF}(p)^s$), or it can be directly fixed. For example, the value M=200 allows the pixels in specular areas to have values roughly in the range [200,255], such a range allows to estimate the specular parameters. A value too close to 255 would saturate most of the intensity values and would prevent a possible estimation of these parameters.
The method discussed above can be applied to pixel intensity or to each channel of the pixel color.
If a diffuse white surface is not available, either the color of the ambient lighting $L_b$ must be known, it can be measured by an external means e.g. a luxmeter, or the RGB reflectance $k_d(p)$ of a diffuse surface patch must be known (in the range [0,255] per component), from which $L_b$ is derived from the ambient image via equation $I_A(p) = k_d(p) \cdot L_b$. Once the ambient light intensity $L_b$ is determined, the rest of the method for determining the texture-free map remains the same as discussed above.
If the camera is static, the captured "ambient" image and the on-line video are registered indeed. However, in augmented reality application, the user often has the possibility to move, and thus the video camera is moving.
In that case, the on-line captured image and the "ambient" image must be registered.
FIG. 6 illustrates an exemplary method for processing a 3D scene according to another embodiment of the present disclosure.
According to this embodiment, it is assumed that the 3D model of the scene and the camera intrinsic parameters and relative viewpoint poses are known.
According to this embodiment, at step 60, a set of ambient images are acquired under ambient lighting from different viewpoints. This allows to take into account that if the distance between the viewpoints at which the input images are captured is large, numerous scene areas that are visible in one viewpoint are not visible in the other one. The set of "ambient" images is captured with their viewpoint 3D pose and stored.
During on-line processing, at step 61, an image is captured by the moving camera under any lighting conditions.
At step 62, the 3D pose of the camera is estimated.
At step 63, the estimated 3D pose of the camera is used to select a reference image. The reference image is selected as the best "ambient" image among the set of ambient images. For instance, the ambient image corresponding to a viewpoint providing the largest number of points seen in both views (ambient image and input image) is selected.

At step 64, the 3D pose of the viewpoint of the selected ambient image is then used to register the input image captured at step 61 with respect to the "ambient" image.

At step 65, the "texture-free" map can then be determined using the registered captured image and the reference image selected, as discussed with FIG. 4.

At step 66, for instance, the determined "texture-free" map can be used for determining the lighting parameters of the scene, e.g. the light sources 3D poses and color intensity. Such lighting parameters can be used on-line in an Mixed Reality application, for instance for lighting virtual objects inserted in the 3D scene. Lighting parameters are determined using the "texture-free" map as input to the process, using the method discussed with FIG. 1 or using any known methods, for instance the ones described in the documents cited above.

Another solution for determining a reference image in the case of a moving camera is to assign a texture map to the 3D model of the scene such that this texture map is acquired under "ambient" lighting. Then, in on-line processing, an "ambient" image is rendered for each captured image such that the viewpoint of this "ambient" image is the same as the viewpoint of the current input image (they have the same 3D pose). According to this embodiment, the "ambient" image is determined by computing an image rendered at the viewpoint of the on-line captured image, using the texture map acquired under "ambient" lighting. The rest of the method for determining the "texture-free" map is performed as discussed with FIG. 4.

FIG. 7 illustrates an exemplary apparatus for processing a 3D scene according to an embodiment of the present disclosure. FIG. 7 illustrates a block diagram of an exemplary system 700 in which various aspects of the exemplary embodiments may be implemented. The system 700 may be embodied as a device including the various components described below and is configured to perform the processes described above. Examples of such devices, include, but are not limited to, mobile devices, personal computers, laptop computers, smartphones, tablet computers, digital multimedia set top boxes, digital television receivers, personal video recording systems, connected home appliances, and servers. The system 700 may be communicatively coupled to other similar systems, and to a display via a communication channel.

Various embodiments of the system 700 include at least one processor 710 configured to execute instructions loaded therein for implementing the various processes as discussed above. The processor 710 may include embedded memory, input output interface, and various other circuitries as known in the art. The system 700 may also include at least one memory 720 (e.g., a volatile memory device, a non-volatile memory device). The system 700 may additionally include a storage device 740, which may include non-volatile memory, including, but not limited to, EEPROM, ROM, PROM, RAM, DRAM, SRAM, flash, magnetic disk drive, and/or optical disk drive. The storage device 740 may comprise an internal storage device, an attached storage device, and/or a network accessible storage device, as non-limiting examples.

Program code to be loaded onto one or more processors 710 to perform the various processes described hereinabove may be stored in the storage device 740 and subsequently loaded onto the memory 720 for execution by the processors 710. In accordance with the exemplary embodiments, one or more of the processor(s) 710, the memory 720, and the storage device 740, may store one or more of the various items during the performance of the processes discussed herein above, including, but not limited to ambient images, captured input images, texture map, texture-free map, cast shadows map, 3D scene geometry, viewpoint's 3D pose, lighting parameters, variables, operations, and operational logic.

The system 700 may also include a communication interface 750 that enables communication with other devices via a communication channel. The communication interface 750 may include, but is not limited to a transceiver configured to transmit and receive data from the communication channel. The communication interface 750 may include, but is not limited to, a modem or network card and the communication channel 750 may be implemented within a wired and/or wireless medium. The various components of the system 700 may be connected or communicatively coupled together (not shown) using various suitable connections, including, but not limited to internal buses, wires, and printed circuit boards.

The system 700 also includes user interactions means 730 coupled to the processor for receiving user inputs.

The system 700 also includes video capturing means 760, such as a camera, coupled to the processor for capturing video images.

The system 700 also includes video rendering means 770, such as a projector, or a screen, coupled to the processor for rendering the processed 3D scene.

The exemplary embodiments may be carried out by computer software implemented by the processor 710 or by hardware, or by a combination of hardware and software. As a non-limiting example, the exemplary embodiments may be implemented by one or more integrated circuits. The memory 720 may be of any type appropriate to the technical environment and may be implemented using any appropriate data storage technology, such as optical memory devices, magnetic memory devices, semiconductor-based memory devices, fixed memory, and removable memory, as non-limiting examples. The processor 710 may be of any type appropriate to the technical environment, and may encompass one or more of microprocessors, general purpose computers, special purpose computers, and processors based on a multi-core architecture, as non-limiting examples.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), tablets, Head-Mounted Devices, and other devices that facilitate virtual reality applications.

A method for processing a 3D scene is disclosed. Such a method comprises:
    obtaining a reference image representative of an image of the scene captured under ambient lighting,
    determining a texture-free map from said reference image and an input image,
    processing said 3D scene using said texture-free map.

According to the present disclosure, the determined "texture-free" map is representative of the input image without the specular reflectance components. Such a "texture-free" map can then be used for instance as input to a method for lighting parameters estimation based on cast shadows, or using any known method that assumes textureless or weakly textured input images.

Also, the "texture-free" map can also be used in any applications based on intrinsic image decomposition.

According to another aspect of the present disclosure, an apparatus for processing a 3D scene is disclosed. Such an apparatus is configured for:
- obtaining a reference image representative of an image of the scene captured under ambient lighting,
- determining a texture-free map from said reference image and said input image,
- processing said 3D scene using said texture-free map.

According to an embodiment of the present disclosure, processing the 3D scene comprises determining lighting parameters of the scene.

According to another embodiment of the present disclosure, the reference image comprises an area representative of a reference diffuse surface.

According to a variant, the reference diffuse surface is white.

According to another embodiment of the present disclosure, determining a texture-free map from said reference image and said input image comprises determining an ambient light from at least one part of said area representative of a reference diffuse surface.

According to another embodiment of the present disclosure, determining a texture-free map from said reference image and said input image comprises determining a texture map from said ambient light and said reference image.

According to another embodiment of the present disclosure, the texture-free map is determined for each pixel of the input image as a ratio of an intensity of said input image at the pixel over a value of the texture map at the same pixel.

According to another embodiment of the present disclosure, the values of the texture-free map are scaled with a scaling factor. Such a scaling factor can be selected so that a number of pixels with saturated intensity value in the scaled texture-free map is below a value.

According to another embodiment of the present disclosure, determining a reference image representative of an image of the scene captured under ambient lighting comprises:
- selecting the reference image among a set of ambient images captured from different viewpoints, according to a viewpoint corresponding to the input image.

According to this embodiment, it is possible to use a moving camera for capturing the input images, even if the distance between the viewpoints at which the input images are captured is large.

According to another embodiment of the present disclosure, the input image is registered with respect to the viewpoint of the selected reference image and the registered input image is used for determining the texture-free map.

According to another embodiment of the present disclosure, the input image is an image of the scene captured by a camera.

One or more of the present embodiments also provide a computer readable storage medium having stored thereon instructions for processing a 3D scene, according to any one of the embodiments of the method described above. The present embodiments also provide a computer program product including instructions for performing any one of the embodiments of the method described.

The invention claimed is:

1. A method for processing a 3D scene, comprising:
   obtaining an input image of the scene captured by a first camera;
   selecting a reference image of the 3D scene among a set of ambient images of the 3D scene captured from different viewpoints of a second camera under ambient lighting, according to a viewpoint corresponding to said input image, said reference image comprising a reference area representative of a reference diffuse surface captured under said ambient lighting;
   determining a texture map from said reference image according to an ambient light intensity, the ambient light intensity being determined according to at least one part of said reference area;
   determining a texture-free map, a value of a pixel of the texture-free image map being a ratio of an intensity at the corresponding pixel in said input image over a value of an intensity at the same pixel in the texture map; and
   processing said 3D scene using said texture-free map.

2. The method according to claim 1, wherein processing said 3D scene comprises determining lighting parameters of the scene.

3. The method according to claim 1, further comprising scaling said texture-free map with a scaling factor.

4. The method according to claim 3, wherein said scaling factor is selected such that a number of pixels with saturated intensity value in the scaled texture-free map is below a value.

5. The method according to claim 1, further comprising registering said input image with respect to the viewpoint of the selected reference image and wherein determining said texture-free map uses said registered input image.

6. An apparatus configured to process a 3D scene, the apparatus comprising a processor and a memory having stored instructions operative, when executed by the processor, to cause the apparatus to perform:
   obtaining an input image of the scene captured by a first camera,
   selecting a reference image of the 3D scene among a set of ambient images of the 3D scene captured from different viewpoints of a second camera under ambient lighting, according to a viewpoint corresponding, to said input image, said reference image comprising a reference area representative of a reference diffuse surface captured under said ambient lighting,
   determining a texture map from said reference image according to an ambient light intensity, the ambient light intensity being determined according to at least one part of said reference area,
   determining a texture-free map, a value of a pixel of the texture-free image map being a ratio of an intensity at the corresponding pixel in said input image over a value of an intensity at the same pixel in the texture map, and
   processing said 3D scene using said texture-free map.

7. The apparatus according to claim 6, wherein processing said 3D scene comprises determining lighting parameters of the scene.

8. The apparatus according to claim 6, wherein the processor is configured to perform scaling said texture-free map with a scaling factor.

9. The apparatus according to claim 8, wherein said scaling factor is selected by said processor such that a number of pixels with saturated intensity value in the scaled texture-free map is below a value.

10. The apparatus according to claim 6, wherein said processor is configured to perform registering said input image with respect to the viewpoint of the selected reference image and wherein determining said texture-free map uses said registered input image.

11. A non-transitory computer-readable storage medium having stored instructions that, when executed by a processor, cause the processor to perform:
 obtaining an input image of the scene captured by a first camera,
 selecting a reference image of the 3D scene among a set of ambient images of the 3D scene captured from different viewpoints of a second camera under ambient lighting,
 according to a viewpoint corresponding to said input image, said reference image comprising a reference area representative of a reference diffuse surface captured under said ambient lighting;
 determining a texture map from said reference image according to an ambient light intensity, the ambient light intensity being determined according to at least one part of said reference area;
 determining a texture-free map, a value of a pixel of the texture-free map being a ratio of an intensity at the corresponding pixel in said input image over a value of an intensity at the same pixel in the texture map; and
 processing said 3D scene using said texture-free map.

12. The non-transitory computer-readable storage medium according to claim 11, wherein processing the 3D scene comprises determining lighting parameters of the scene.

13. The non-transitory computer-readable storage medium according to claim 11, further comprising instructions that cause the processor to perform scaling the texture-free map with a scaling factor.

14. The non-transitory computer-readable storage medium according to claim 13, wherein the scaling factor is selected such that a number of pixels with saturated intensity value in the scaled texture-free map is below a value.

15. The non-transitory computer-readable storage medium according to claim 11, further comprising instructions that cause the processor to perform registering the input image with respect to the viewpoint of the selected reference image and wherein determining the texture-free map uses the registered input image.

* * * * *

UNITED STATES PATENT AND TRADEMARK OFFICE
CERTIFICATE OF CORRECTION

PATENT NO. : 10,930,059 B2
APPLICATION NO. : 16/390098
DATED : February 23, 2021
INVENTOR(S) : Salma Jiddi, Gregoire Nieto and Philippe Robert It is certified that error appears in the above-identified patent and that said Letters Patent is hereby corrected as shown below:

On the Title Page

Item (56) other publications, Line 4, delete "ADJUNT)," and insert --ADJUNCT),--

In the Claims

At Column 12, Line 19, Claim 1, after "texture-free" delete "image"

At Column 12, Line 46, Claim 6, delete "corresponding," and insert --corresponding--

At Column 12, Line 55, Claim 6, after "texture-free" delete "image"

Signed and Sealed this
Twenty-sixth Day of December, 2023

Katherine Kelly Vidal
*Director of the United States Patent and Trademark Office*